United States Patent
Qin et al.

(10) Patent No.: US 8,824,495 B2
(45) Date of Patent: Sep. 2, 2014

(54) SYSTEM AND METHOD FOR RESERVATION OF DISJOINT TIME INTERVALS IN WIRELESS LOCAL AREA NETWORKS

(75) Inventors: Xiangping Qin, Carbondale, IL (US); Harkirat Singh, Santa Clara, CA (US); Chiu Ngo, San Francisco, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 847 days.

(21) Appl. No.: 12/415,981

(22) Filed: Mar. 31, 2009

(65) Prior Publication Data

US 2010/0002639 A1 Jan. 7, 2010

Related U.S. Application Data

(60) Provisional application No. 61/077,820, filed on Jul. 2, 2008.

(51) Int. Cl.
*H04L 12/43* (2006.01)
*H04W 74/08* (2009.01)

(52) U.S. Cl.
CPC .............................. *H04W 74/0891* (2013.01)
USPC ........... 370/458; 370/329; 370/346; 370/348; 370/433; 370/449

(58) Field of Classification Search
USPC ......... 370/229, 230, 310, 312, 328, 329, 336, 370/337, 338, 345, 346, 347, 348, 349, 350, 370/432, 433, 442, 449, 450, 458, 459
See application file for complete search history.

(56) References Cited

U.S. PATENT DOCUMENTS

| | | |
|---|---|---|
| 5,615,212 A | 3/1997 | Ruszczyk et al. |
| 5,886,993 A | 3/1999 | Ruszczyk et al. |
| 6,198,728 B1 | 3/2001 | Hulyalkar et al. |
| 6,795,421 B1 | 9/2004 | Heinonen et al. |
| 6,807,158 B2 | 10/2004 | Krishnamurthy et al. |
| 6,813,277 B2 | 11/2004 | Edmon et al. |
| 6,868,072 B1 | 3/2005 | Lin et al. |
| 6,925,064 B2 | 8/2005 | Hester et al. |
| 7,088,702 B2 | 8/2006 | Shvodian |
| 7,127,254 B2 | 10/2006 | Shvodian et al. |
| 7,184,767 B2 | 2/2007 | Gandolfo |
| 7,197,025 B2 | 3/2007 | Chuah |
| 7,251,235 B2 | 7/2007 | Wentink |
| 7,280,518 B2 | 10/2007 | Montano et al. |

(Continued)

OTHER PUBLICATIONS

Harada, Hiroshi, Unified and flexible millimeter wave WPAN systems supported by common mode. *IEEE 802.15-07-0761-10-003c*, Slides 1-62, Sep. 2007.

(Continued)

*Primary Examiner* — Ricky Ngo
*Assistant Examiner* — Wei-Po Kao
(74) *Attorney, Agent, or Firm* — Kenneth L. Sherman, Esq.; Michael Zarrabian, Esq.; Sherman & Zarrabian LLP

(57) ABSTRACT

A system and method of reserving bandwidth for disjoint time intervals in a wireless network. Parameters for a disjoint network allocation vector (NAV) define a reservation of a plurality of disjoint time durations during which transmissions by devices other than a target device are deferred. Parameters are sent as a control or data packet over a network and received by the devices associated with the network.

43 Claims, 10 Drawing Sheets

Disjoint NAV

(56) References Cited

U.S. PATENT DOCUMENTS

| | | | |
|---|---|---|---|
| 7,280,801 | B2 | 10/2007 | Dahl |
| 7,339,916 | B2 | 3/2008 | Kwon et al. |
| 7,356,341 | B2 | 4/2008 | Nanda |
| 7,359,398 | B2 | 4/2008 | Sugaya |
| 7,385,943 | B2 | 6/2008 | Niddam |
| 7,388,833 | B2 | 6/2008 | Yuan et al. |
| 7,400,899 | B2 | 7/2008 | Shin et al. |
| 7,447,180 | B2 | 11/2008 | Jeong et al. |
| 7,474,686 | B2 | 1/2009 | Ho |
| 7,480,266 | B2 | 1/2009 | Murty et al. |
| 7,486,650 | B2 | 2/2009 | Trainin |
| 7,539,930 | B2 | 5/2009 | Ginzburg et al. |
| 7,545,771 | B2 | 6/2009 | Wentink et al. |
| 7,561,510 | B2 | 7/2009 | Imamura et al. |
| 7,570,656 | B2 | 8/2009 | Raphaeli et al. |
| 7,590,078 | B2 | 9/2009 | Nanda |
| 7,623,542 | B2 | 11/2009 | Yonge et al. |
| 7,634,275 | B2 | 12/2009 | Odman |
| 7,664,132 | B2 | 2/2010 | Benveniste |
| 7,680,150 | B2 | 3/2010 | Liu et al. |
| 7,787,487 | B2 | 8/2010 | Liu |
| 7,860,054 | B2 | 12/2010 | Benveniste |
| 7,881,340 | B2 | 2/2011 | Farrag et al. |
| 7,924,805 | B2 | 4/2011 | Nishibayashi et al. |
| 7,974,261 | B2 | 7/2011 | Lane et al. |
| 8,072,961 | B2 | 12/2011 | Takano |
| 8,089,946 | B2 | 1/2012 | Broomer |
| 8,179,867 | B2 | 5/2012 | Seok |
| 8,194,626 | B2 | 6/2012 | Moorti et al. |
| 8,437,317 | B2 | 5/2013 | Jang et al. |
| 8,532,221 | B2 | 9/2013 | Liu et al. |
| 2003/0003905 | A1 | 1/2003 | Shvodian |
| 2003/0137970 | A1 | 7/2003 | Odman |
| 2003/0137993 | A1 | 7/2003 | Odman |
| 2003/0152059 | A1 | 8/2003 | Odman |
| 2003/0214967 | A1 | 11/2003 | Heberling |
| 2004/0047319 | A1* | 3/2004 | Elg .................. 370/338 |
| 2004/0053621 | A1 | 3/2004 | Sugaya |
| 2004/0199686 | A1 | 10/2004 | Karaoguz |
| 2004/0203474 | A1* | 10/2004 | Miller et al. ............ 455/69 |
| 2004/0214571 | A1 | 10/2004 | Hong |
| 2004/0218683 | A1 | 11/2004 | Batra et al. |
| 2004/0264475 | A1 | 12/2004 | Kowalski |
| 2005/0058151 | A1 | 3/2005 | Yeh |
| 2005/0130634 | A1 | 6/2005 | Godfrey |
| 2005/0135318 | A1 | 6/2005 | Walton et al. |
| 2005/0232275 | A1 | 10/2005 | Stephens |
| 2006/0002428 | A1 | 1/2006 | Trainin |
| 2006/0050742 | A1 | 3/2006 | Grandhi et al. |
| 2006/0166683 | A1 | 7/2006 | Sharma et al. |
| 2006/0176908 | A1 | 8/2006 | Kwon et al. |
| 2006/0193279 | A1 | 8/2006 | Gu et al. |
| 2006/0268800 | A1 | 11/2006 | Sugaya et al. |
| 2006/0285516 | A1 | 12/2006 | Li et al. |
| 2007/0116035 | A1 | 5/2007 | Shao et al. |
| 2007/0160009 | A1* | 7/2007 | Joshi .................. 370/331 |
| 2007/0280180 | A1 | 12/2007 | Dalmases et al. |
| 2008/0159208 | A1 | 7/2008 | Kloker et al. |
| 2008/0279204 | A1 | 11/2008 | Pratt, Jr. et al. |
| 2008/0291873 | A1 | 11/2008 | Benveniste |
| 2009/0052389 | A1 | 2/2009 | Qin et al. |
| 2009/0086706 | A1 | 4/2009 | Huang et al. |
| 2009/0092086 | A1 | 4/2009 | Lee et al. |
| 2009/0275292 | A1* | 11/2009 | Chang .................. 455/69 |
| 2009/0285163 | A1 | 11/2009 | Zhang et al. |
| 2009/0323611 | A1 | 12/2009 | Singh et al. |
| 2010/0046453 | A1 | 2/2010 | Jones, IV et al. |
| 2010/0046518 | A1 | 2/2010 | Takagi et al. |
| 2010/0220601 | A1 | 9/2010 | Vermani et al. |
| 2010/0310003 | A1 | 12/2010 | Lauer et al. |
| 2011/0002319 | A1 | 1/2011 | Husen et al. |
| 2011/0064013 | A1 | 3/2011 | Liu et al. |
| 2011/0090855 | A1 | 4/2011 | Kim |
| 2011/0176627 | A1 | 7/2011 | Wu et al. |
| 2011/0235513 | A1 | 9/2011 | Ali |
| 2011/0255618 | A1 | 10/2011 | Zhu et al. |
| 2011/0317630 | A1 | 12/2011 | Zhu et al. |
| 2012/0008490 | A1 | 1/2012 | Zhu |
| 2012/0082200 | A1 | 4/2012 | Verikoukis et al. |
| 2012/0087358 | A1 | 4/2012 | Zhu et al. |
| 2012/0140615 | A1 | 6/2012 | Gong |
| 2012/0218947 | A1 | 8/2012 | Merlin et al. |
| 2012/0314694 | A1 | 12/2012 | Hsieh |
| 2014/0010144 | A1* | 1/2014 | Liu et al. .............. 370/312 |

OTHER PUBLICATIONS

IEEE 802.16e™'—2005, Standard for Local and Metropolitan Area Networks—Part 16: Air Interface for Fixed and Mobile Broadband Wireless Access Systems; Amendment 2: Physical and Medium Access Control Layers for Combined Fixed and Mobile Operation in Licensed Bands and Corrigendum 1;—Feb. 28, 2006, pp. 1-864.

IEEE 802.11, Standard for Information Technology—Telecommunications and Information Exchange between Systems—Local and Metropolitan Area Networks—Specific requirements Part 11: Wireless LAN Medium Access Control (MAC) and Physical Layer (PHY) Specifications—2007 (Revision of IEEE Std 802.-1999), IEEE Computer Society, 1232 pages, (Jun. 12, 2007).

IEEE P802.11e/D13.0, "Amendment: Medium Access Control (MAC) Quality of Service (QoS) Enhancements," Jan. 2005, pp. 1-198.

IEEE Wireless LAN Edition (2003), A compilation based on IEEE Std. 802.11TM-1999 (R 2003) and its Amendments.

International Search Report dated Jan. 9, 2009 for Application No. PCT/KR08/004793, filed Aug. 19, 2008.

Kim et al., QoS enhancement scheme of EDCF in IEEE 802.11e wireless LANs, Electronics Letters 40(17): 1091-1092, Aug. 19, 2004.

Mujtaba et al., TGn Sync Proposal Technical Specification, IEEE 802.11-04-08 89r7, Jul. 2005.

U.S. Office Action dated Aug. 21, 2007 in U.S. Appl. No. 11/044,600, filed Jan. 26, 2005.

U.S. Office Action dated Aug. 7, 2008 in U.S. Appl. No. 11/044,600, filed Jan. 26, 2005.

U.S. Office Action dated Jan. 15, 2008 in U.S. Appl. No. 11/044,600, filed Jan. 26, 2005.

U.S. Office Action dated Jan. 25, 2007 in U.S. Appl. No. 11/044,600, filed Jan. 26, 2005.

U.S. Office Action dated Jun. 27, 2006 in U.S. Appl. No. 11/044,600, filed Jan. 26, 2005.

U.S. Office Action dated Jun. 9, 2009 in U.S. Appl. No. 11/589,519, filed Oct. 30, 2006.

U.S. Non-Final Office Action mailed Oct. 26, 2011 for U.S. Appl. No. 12/455,438.

Mirkovic, J. et al., "A MAC Protocol With Multi-User MIMO Support for Ad-Hoc WLANs", The 18th Annual IEEE International Symposium on Personal, Indoor and Mobile Radio Communications (PIMRC'07), IEEE, 2007, pp. 1-5, United States.

Stacey, R. et al., "DL MU-MIMO Ack Protocol (IEEE 802.11-09/1172r0)", IEEE, Nov. 16, 2009, pp. 1-8, United States.

IEEE Computer Society, "IEEE Std 802®-2001 (R2007), IEEE Standard for Local and Metropolitan Area Networks: Overview and Architecture", IEEE, Feb. 7, 2002, pp. i-36, New York, United States 4.

Camp, J.D. et al., "The IEEE 802.11s Extended Service Set Mesh Networking Standard", IEEE Communications Magazine, vol. 46, No. 8, IEEE, Aug. 2008, pp. 1-6, United States.

U.S. Final Office Action mailed May 12, 2010 for U.S. Appl. No. 11/589,519.

U.S. Notice of Allowance mailed Jan. 24, 2011 for U.S. Appl. No. 11/589,519.

U.S. Final Office Action for U.S. Appl. No. 12/821,940 mailed Aug. 21, 2012.

U.S. Final Office Action mailed Apr. 12, 2012 for U.S. Appl. No. 12/455,438.

U.S. Non-Final Office Action mailed May 29, 2012 for U.S. Appl. No. 12/821,940.

(56) References Cited

OTHER PUBLICATIONS

U.S. Notice of Allowance mailed Oct. 21, 2013 for U.S. Appl. No. 12/455,438.
U.S. Restriction Requirement for U.S. Appl. No. 13/030,070 mailed Nov. 5, 2013.
U.S. Restriction Requirement for U.S. Appl. No. 13/253,926 mailed Oct. 10, 2013.
Morioka, Y. et al., "Multi-RTS Proposal", IEEE 802.11-10/1124r01, Sep. 12, 2010, Slides 1-14, IEEE, USA.
U.S. Non-Final Office Action mailed Jul. 11, 2013 for U.S. Appl. No. 12/455,438.
U.S. Non-Final Office Action for U.S. Appl. No. 13/177,386 mailed Dec. 17, 2013.
U.S. Non-Final Office Action for U.S. Appl. No. 13/253,926 mailed Nov. 25, 2013.
U.S. Non-Final Office Action for U.S. Appl. No. 12/821,940 mailed Jun. 24, 2014.
U.S. Non-Final Office Action for U.S. Appl. No. 13/030,070 mailed May 15, 2014.
U.S. Final Office Action for U.S. Appl. No. 13/253,926 mailed Apr. 29, 2014.

\* cited by examiner

FIG. 1 WLAN

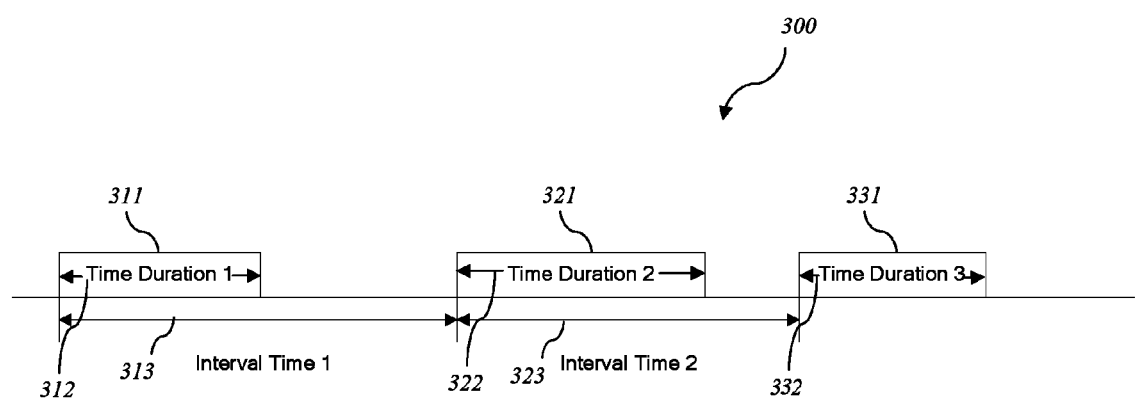
FIG. 3 Disjoint NAV

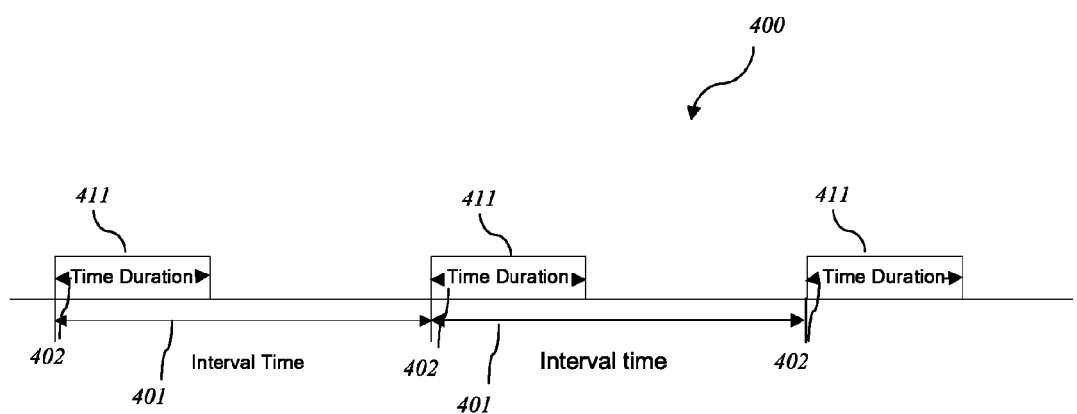
FIG. 4 AV NAV

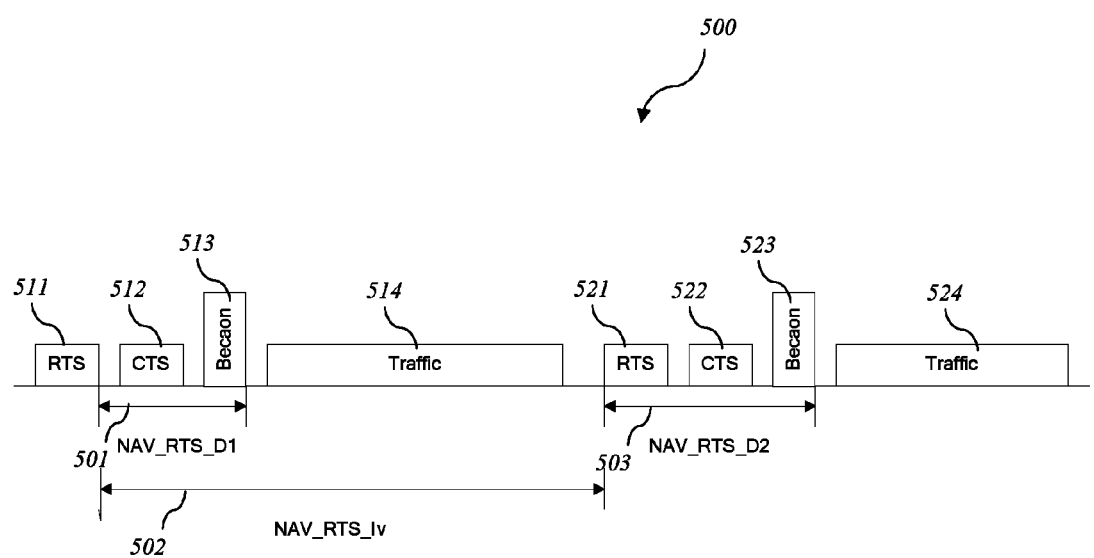
FIG. 5 Beacon protection

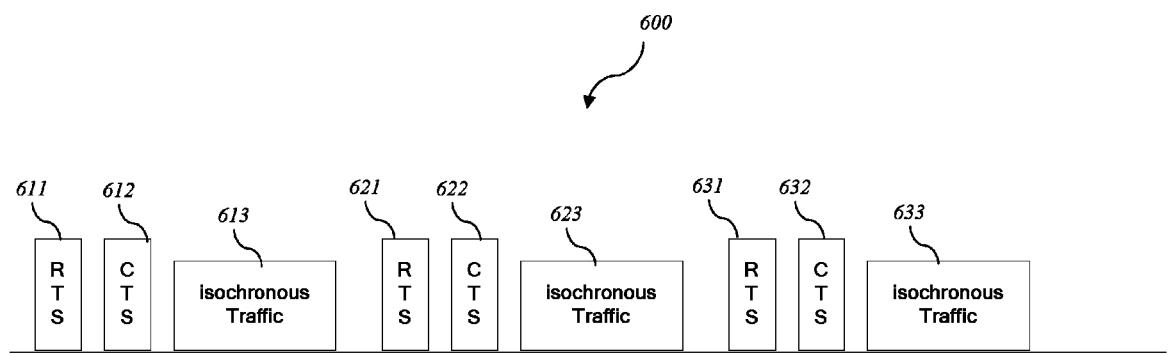
FIG. 6 Isochronous AV Traffic

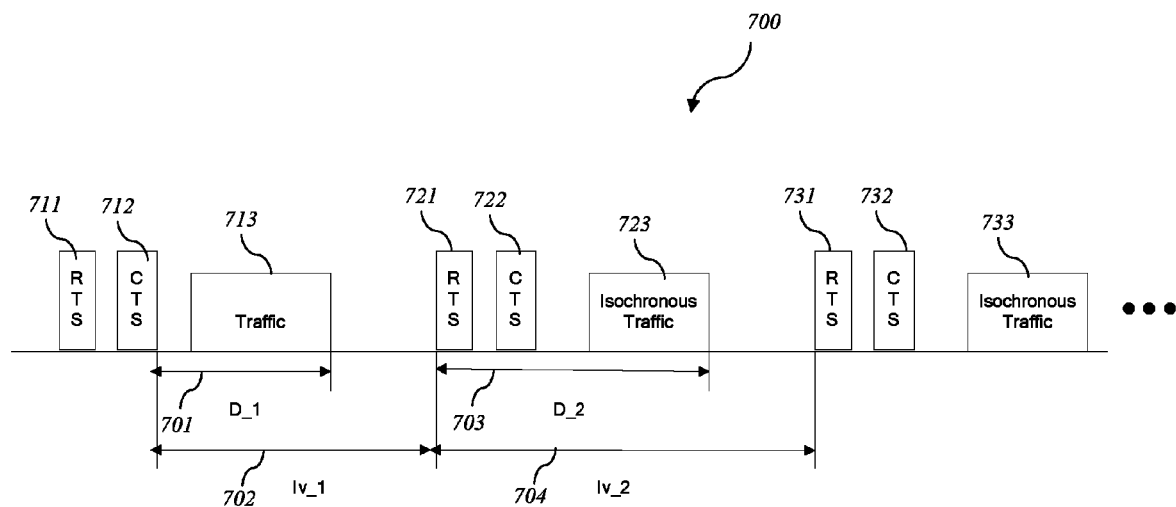
FIG. 7 Combination NAV

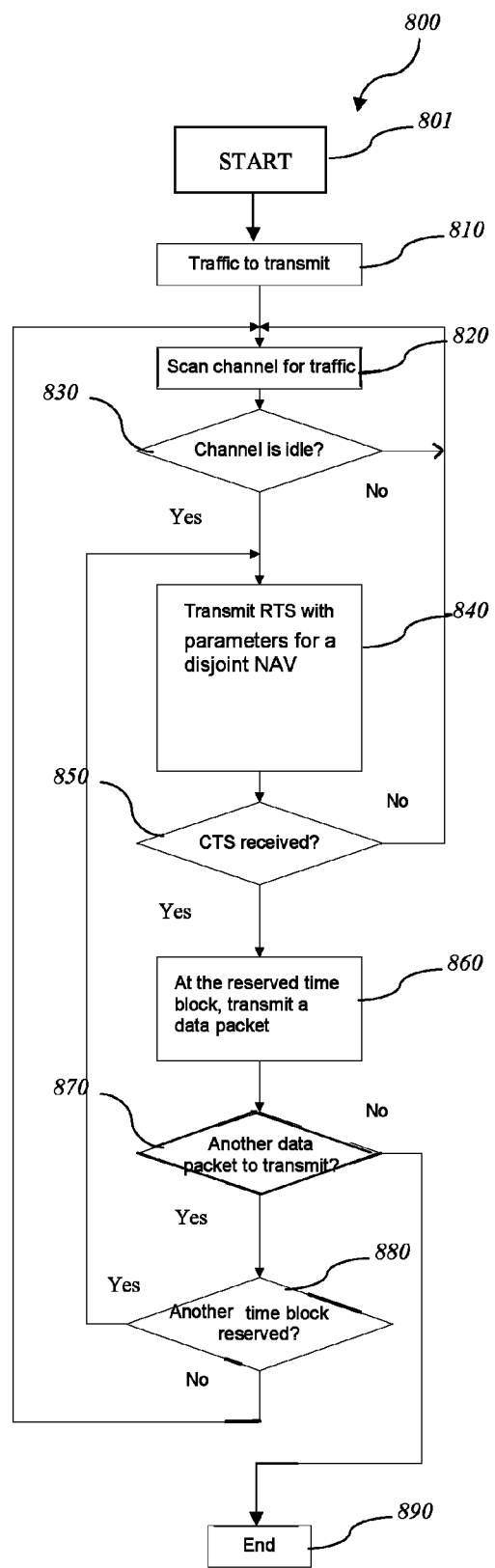
FIG. 8 Transmitter

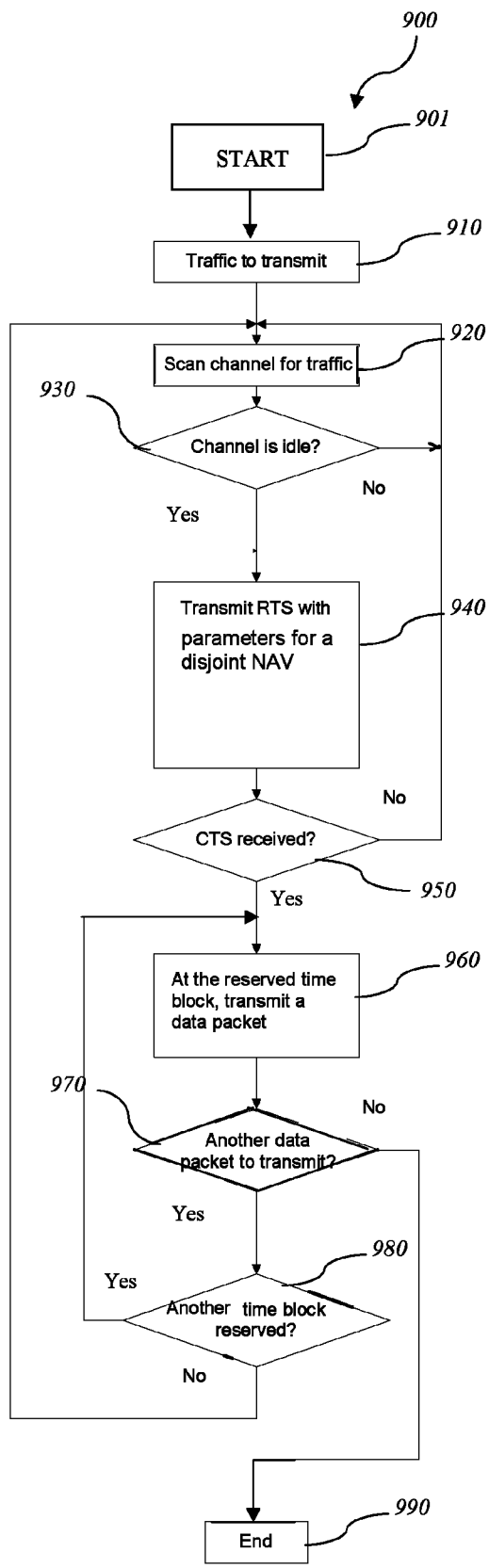
FIG. 9 Transmitter

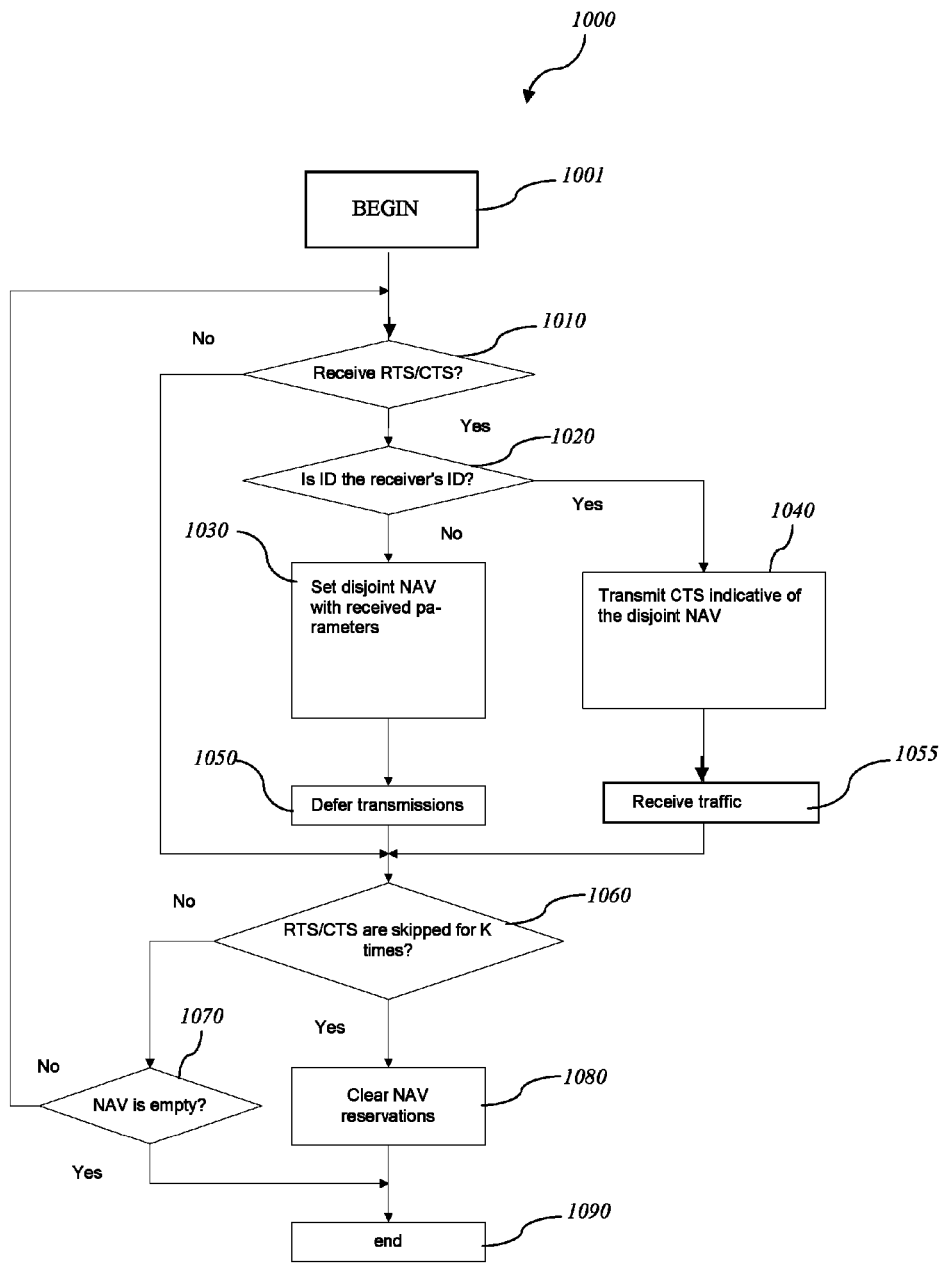
FIG. 10 Receiver

SYSTEM AND METHOD FOR RESERVATION OF DISJOINT TIME INTERVALS IN WIRELESS LOCAL AREA NETWORKS

BACKGROUND OF THE INVENTION

This application claims the benefit of U.S. Provisional Application No. 61/077,820, filed on Jul. 2, 2008, which is incorporated herein by reference in its entirety. This application is related to a copending application entitled SYSTEM AND METHOD FOR BANDWIDTH RESERVATION PROTOCOL FOR SPATIAL REUSE IN A WIRELESS COMMUNICATION NETWORK, U.S. application Ser. No. 12/179,457 which has been filed on Jul. 24, 2008, and also to a copending application entitled SYSTEM AND METHOD FOR RANDOM ACCESS SCHEME IN A WIRELESS AD-HOC NETWORK, U.S. application Ser. No. 12/172,858 which has been filed on Jul. 14, 2008, the entire disclosures of which applications are hereby incorporated by reference.

FIELD OF THE INVENTION

This invention relates to wireless communication systems and, in particular, to new types of a Network Allocation Vector (NAV) to protect wireless transmissions from interfering by deferring other devices.

DESCRIPTION OF THE RELATED TECHNOLOGY

In some communications systems, a Network Allocation Vector (NAV) is used to protect wireless transmissions from interfering by preventing other devices from transmitting when another device is transmitting.

For example, in the IEEE 802.11 standard, a NAV is a single value indicating a single time period. For example, it can indicate a number of micro-seconds. The NAV is set according to the duration and ID field provided in polling messages or request-to-send or clear-to-send (RTS/CTS) frames. These polling messages or RTS/CTS frames are sent before transmission of data frames that are to be protected. Each device on the network receives this information for data to be transmitted. The ID field indicates which device is the intended recipient device of the data. Devices, other than the one which has the indicated ID, then set the NAV for the duration of the frame plus some subsequent time for acknowledgements and inter-frame time. The NAV settings indicate to these devices a time period to defer transmissions. Therefore, only one device will transmit data at a time. Accordingly, the transmission between the targeted devices is protected.

Using the current NAV setting in IEEE 802.11, the transmission of the beacons and other isochronous or periodic traffic can not be guaranteed as only one time block is protected even though there are multiple data blocks to be sent at periodic time intervals. Typically, Access Point (AP) and Quality of Service (QoS) devices such as audio/video (AV) devices are given higher priorities to transmit in a network. When there are multiple APs or high priority devices present, however, the contention can delay the desired transmission resulting in degraded quality of services. Further, in the current 802.11 NAV setting, there is no way to schedule such transmission of multiple devices for multiple time periods.

SUMMARY OF CERTAIN INVENTIVE ASPECTS

The system, method, and devices described herein each have several aspects, no single one of which is solely responsible for its desirable attributes. Without limiting the scope of this invention as expressed by the claims which follow, its more prominent features will now be discussed briefly.

In one embodiment, there is a method of reserving bandwidth for disjoint time intervals in a wireless network, the method comprising transmitting a first control packet comprising parameters for a disjoint network allocation vector (NAV), the parameters indicative of a plurality of disjoint time blocks during which transmissions by one or more other devices in the wireless network are to be deferred.

In another embodiment there is a method of reserving bandwidth for disjoint time intervals in a wireless network, the method comprising receiving a control packet comprising parameters for a disjoint network allocation vector (NAV), the parameters indicative of a target device and a plurality of disjoint time blocks during which transmissions by one or more devices other than the target device are to be deferred; determining that a receiving device is not the target device; setting the disjoint NAV vector; and deferring transmissions of data packets during one or more of the plurality of disjoint time blocks.

In another embodiment there is a method of reserving bandwidth for disjoint time intervals in a wireless network, the method comprising receiving a first control packet comprising parameters for a disjoint network allocation vector (NAV), the parameters indicative of a target device and a plurality of disjoint time blocks during which transmissions by one or more devices other than the target device are to be deferred; determining that a receiving device is the target device; and receiving data packets during one or more of the plurality of the disjoint time blocks.

In another embodiment there is a system for reserving bandwidth for disjoint time intervals in a wireless network, the system comprising a processor configured to generate a control packet comprising parameters for a disjoint network allocation vector (NAV), the parameters indicative of a plurality of disjoint time blocks during which transmissions by one or more other devices in the wireless network are to be deferred.

In another embodiment there is a system for reserving bandwidth for disjoint time intervals in a wireless network, the system comprising a processor configured to receive a control packet comprising parameters for a disjoint network allocation vector (NAV), the parameters indicative of a target device and a plurality of disjoint time blocks during which transmissions by one or more devices other than the target device are to be deferred; determine if a receiving device is the target device; set the disjoint NAV vector if the receiving device is not the target device; defer transmissions of data packets during one or more of the plurality of disjoint time blocks if the disjoint NAV vector is set; and receive data packets during one or more of the plurality of the disjoint time blocks if the receiving device is the target device.

BRIEF DESCRIPTION OF THE DRAWINGS

FIG. 3 is a diagram of an exemplary embodiment of a timeline of non-periodic data transmission over a network.

FIG. 4 is a diagram of an exemplary embodiment of a timeline of periodic data transmission over a network.

FIG. 5 is a diagram of an exemplary embodiment of a timeline of data transmission over a network including beacons.

FIG. 6 is a diagram of an exemplary embodiment of a timeline of periodic data transmission over a network including RTS and CTS messages.

FIG. 7 is a diagram of an exemplary embodiment of a timeline of both non-periodic and periodic data transmission over a network.

FIG. 8 is a flowchart of an embodiment of a process of setting a disjoint NAV from the perspective of a transmitter.

FIG. 9 is a flowchart of an alternative embodiment of a process of setting a disjoint NAV from the perspective of a transmitter.

FIG. 10 is a flowchart of an embodiment of a process of setting a disjoint NAV from the perspective of a receiver.

DETAILED DESCRIPTION OF CERTAIN INVENTIVE EMBODIMENTS

Disclosed herein is a system and method for reserving wireless medium for disjoint time intervals using new types of Network Allocation Vectors (NAV). This new NAV setting scheme can protect isochronous (e.g., periodic) transmissions, such as regular beacon transmissions and AV transmissions, to enhance Quality of Service (QoS). This new NAV setting can also protect non-periodic transmissions. A new NAV setting is used to reserve time blocks for disjoint transmissions. In one embodiment, periodic traffic is protected by disjoint NAV settings. In an exemplary embodiment, non-periodic traffic is protected for multiple time periods by disjoint NAV settings. In some embodiments, constraints on a duration, period and number of reservations are introduced. In an exemplary embodiment, disjoint NAV settings are used to protect transmission in a wireless local area network (WLAN). In some embodiments, the disjoint NAV settings are transmitted over the network or channel in a RTS and/or CTS message or polling message. In other embodiments, the disjoint NAV may be transmitted in a control packet.

Figure 1:
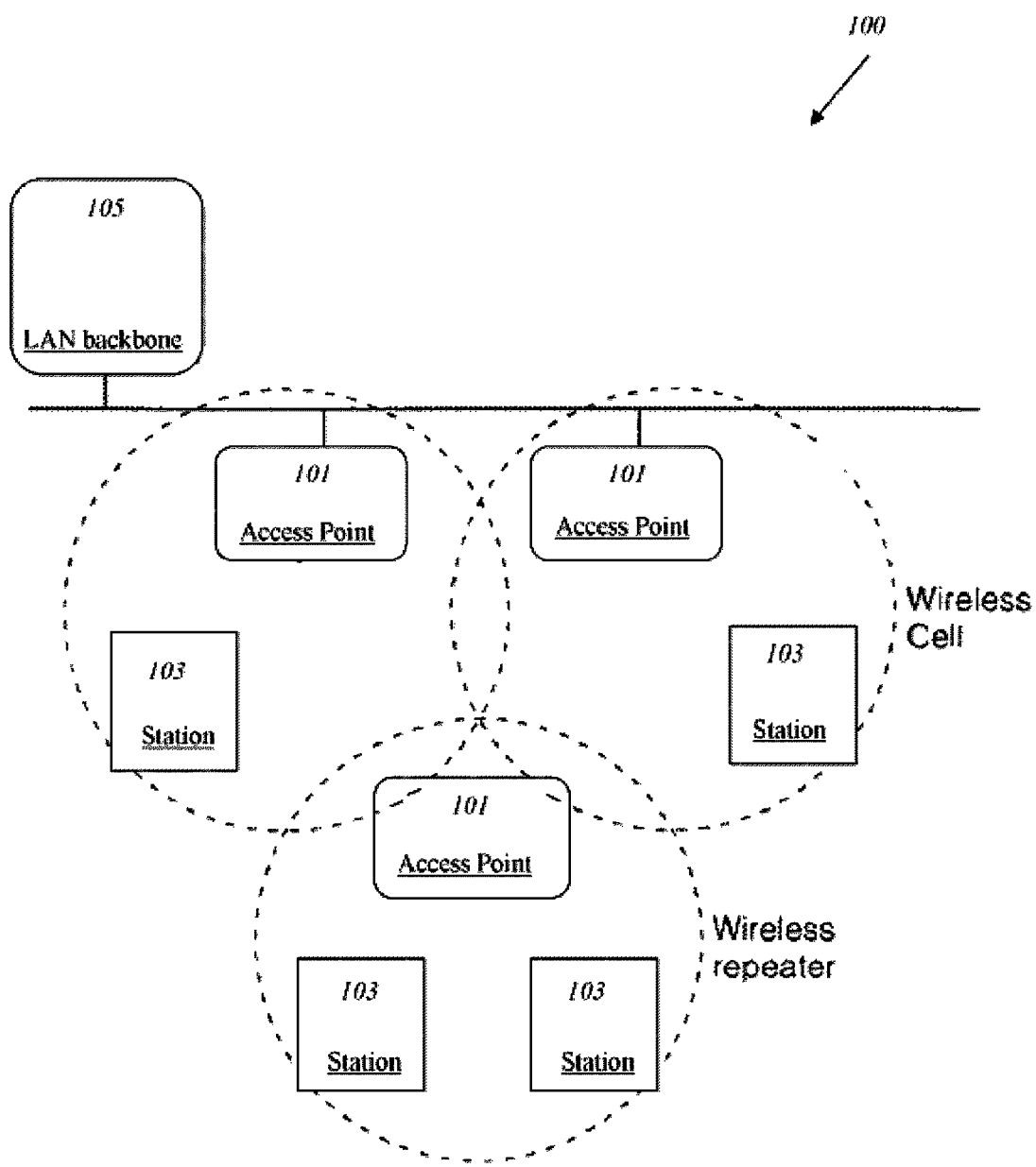
FIG. 1 is a functional block diagram illustrating an exemplary wireless local area network (WLAN) configuration.

Exemplary implementations of embodiments of a WLAN will now be described. FIG. 1 is a block diagram illustrating an exemplary WLAN configuration 100 using an access point (AP) 101. The WLAN configuration 100 of FIG. 1 includes one or more access points 101 and one or more stations 103. In the example WLAN, the stations 103 include wireless clients. The access point 101 is a device that connects a wireless station 103 to the WLAN. In an access point based topology, the access points 101 are connected to a wired (e.g., Ethernet or token ring) or wireless backbone 105 and routes the traffic through the wired or wireless backbone. In a WLAN, the access point 101 enables a wireless station 103 to communicate with other wired or wireless stations on the WLAN 100. In some embodiments, the access point 101 supports the IEEE 802.11 Protocol.

In certain embodiments, the access point 101 includes a receiver of wireless signals, and the wireless station 103 includes a sender of the wireless signals. In other embodiments, the access point 101 includes a sender of wireless signals, and the wireless station 103 includes a receiver of the wireless signals. In some of such embodiments, the wireless signals include audio content. In other embodiments, the wireless signals include video content. In yet another embodiment, the wireless signals include text content such as a publication. The access point 101 can be a sink of video and/or audio data implemented, such as, in a high definition television (HDTV) set in a home wireless network environment. The wireless station 103 can be a source of compressed or uncompressed video or audio. Examples of the wireless station 103 include a desktop computer, a laptop computer, a set-top box, a DVD player or recorder, a digital camera, a camcorder, and so forth. In some embodiments, the content can be protected content.

It should be noted, that while the network has been described above including certain features, the network may include fewer or additional features. For example, the WLAN configuration 100 may include fewer or more wireless stations 103 and fewer or more AP 101. Further, some stations 103 may be wired to an AP 101. Some stations 103 may be associated with multiple APs 101. The WLAN may operate in a frequency from about 2.4 GHz to about 60 GHz. Further the network may not include a backbone 105 (e.g., mesh network) or may include multiple backbones 105.

Figure 2:
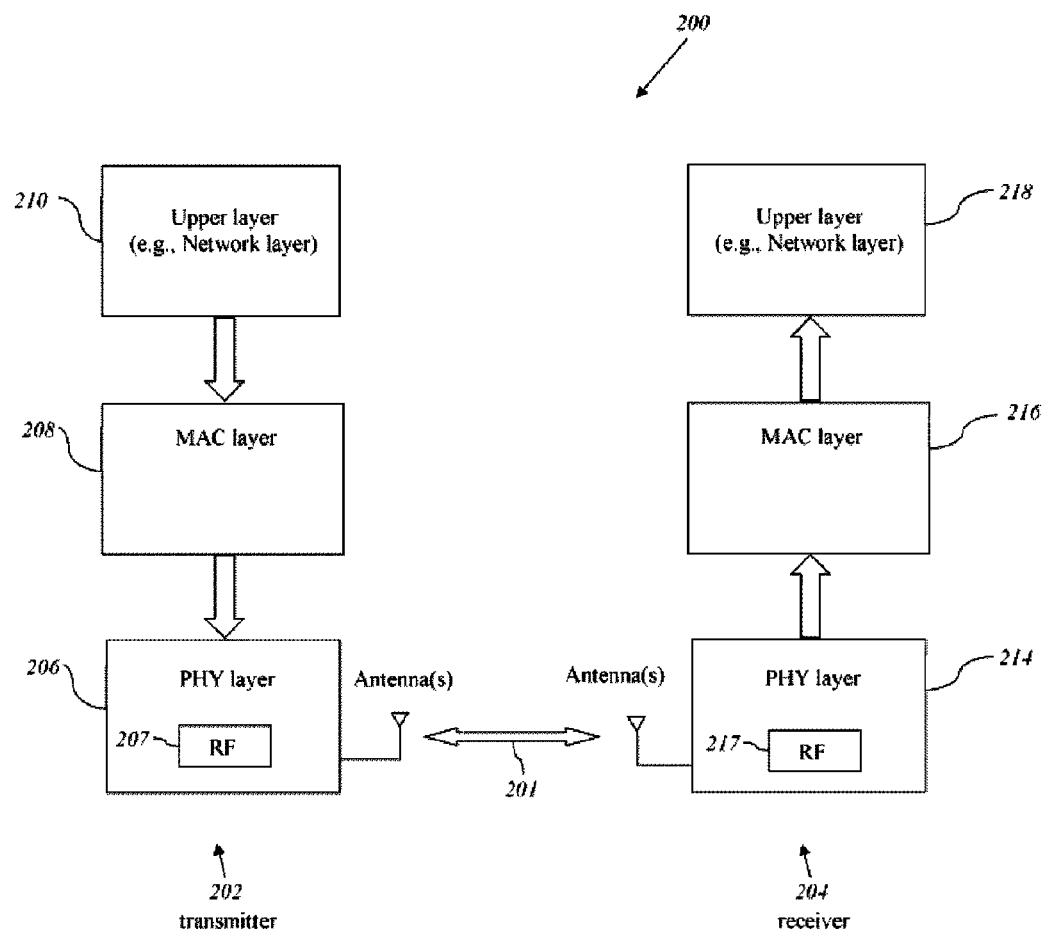
FIG. 2 is a block diagram illustrating exemplary embodiments of receivers and transmitters used in a WLAN.

FIG. 2 shows a generalized block diagram illustrating an exemplary embodiment of a WLAN system 200. The WLAN system 200 includes a wireless transmitter 202 and wireless receiver 204. In certain embodiments, the WLAN system 200 shown in FIG. 2 represents an IEEE 802.11 stack. The transmitter 202 includes a physical (PHY) layer 206, a media access control (MAC) layer 208, an upper layer 210 (e.g. network layer), and one or more antennas. Similarly, the receiver 204 includes a PHY layer 214, a MAC layer 216, an upper layer 218, and one or more antennas. In some embodiments, the PHY layers 206, 214 include radio frequency (RF) modules 207, 217 respectively. The PHY layers 206, 214 provide wireless communication between the transmitter 202 and the receiver 204 via the RF modules 207, 217 and the one or more antennas through a wireless medium 201. The MAC layers 208, 216 provide addressing and channel access controls that make it possible for several network nodes to communicate within a multipoint network such as the WLAN 100 shown in FIG. 1.

The upper layers 210, 218 represent one or more layers that are above the MAC layers 208, 216, respectively, and send command and/or data messages to the MAC layers. In certain embodiments (e.g., OSI or TCP/IP models), the upper layer 210, 218 includes a network layer. In certain embodiments, the network layer includes an IP protocol that performs the basic task of getting data packets from source to destination. In other embodiments (e.g., five-layer TCP/IP model), the upper layer 210, 218 further includes a transport layer and an application layer. In other embodiments, (e.g., seven-layer OSI model), the upper layer 210, 218, in addition to the transport layer and the application layer, further includes a session layer and a presentation layer.

In the wireless transmitter 202, the upper layer 210 provides data (e.g., text, graphics, or audio data) and/or command messages to the MAC layer 208. In certain embodiments, the MAC layer 208 can include a packetization module (not shown) which puts the data and/or command messages into the form of one or more data packets. The MAC layer 208 then passes the data packets to the PHY layer 206. The PHY/MAC layers of the transmitter 202 add PHY and MAC headers to the data packets. The PHY layer 206 transmits wireless signals including the data packets to the receiver 204 via the RF module 207 over the wireless channel 201.

In the wireless receiver 204, the PHY layer 214 receives the transmitted wireless signals including the data packets via the RF module 217. The PHY/MAC layers 214, 216 then process the received data packets to extract one or more data/command messages. The extracted data/command messages are passed to the upper layer 210 where the messages are further processed and/or transferred to other modules or devices to be displayed (text or graphics) or played (audio), for example.

It should be noted though the transmitter 202 and receiver 204 have been described above in one embodiment, other embodiments may include additional or fewer features. For example the receiver 204 and/or transmitter 202 may include additional or fewer layers. Further, the antenna may be associated with a different layer than shown. In other embodiments, some layers may be integrated with each other. In yet other embodiments, the transmitter 202 and or receiver 204 may not include an antenna.

I. Disjoint NAV

FIG. 3 illustrates an exemplary embodiment of a timeline 300 of data transmission over a wireless network. FIG. 3 includes multiple time blocks 311, 321, 331 which are disjoint. In general, time durations of time blocks and time intervals between the time blocks can be different. In one embodiment, disjoint NAV (e.g., NAV for cases in which time durations and/or time intervals are different) can define or specify, for example, Time duration 1 312, Interval time 1 313, Time Duration 2 322, Interval Time 2 323, and Time Duration 3 332 as shown in FIG. 3. The disjoint time blocks 311, 321, 331, as defined by the parameters of disjoint NAV, represent time slots during which a transmitter can make data transmissions to a device (e.g., a target receiver) and other devices (e.g., non-target receivers) defer data transmissions. In an exemplary embodiment, the parameters of disjoint NAV are used to reserve time blocks. For example, the time interval defines when a next reserved time block occurs after the start of the previous reserved time block. The time duration defines the duration of the next reserved time block.

In certain embodiments, the disjoint NAV can define periodic time blocks 411 of an exemplary embodiment of a timeline 400 as shown in FIG. 4. That is to say, time intervals 401 between starting points of consecutive time blocks 411 are the same. In some embodiments, the time blocks 411 are of the same time duration. In other embodiments, time blocks 411 are of different durations. Periodically occurring time blocks of the same duration can be used for audio and video (AV) data transmission and will henceforth be referred to as an AV NAV. However, it should be noted that such a periodic disjoint NAV as AV NAV may also be used for periodic data transmission other than audio and video data transmission. In some embodiments, an AV NAV can be defined or specified by three fields: Time duration 402, Interval Time 401, Number of occurrences (e.g., three in the example shown).

In one exemplary embodiment, the time duration is the duration of time of a transmission between two devices (e.g., a transmitter and a target receiver). In some embodiments, the interval time is the time between the start of consecutive time blocks. In some embodiments, the number of occurrences is the number of time blocks included in this NAV.

It should be noted that other embodiments of disjoint NAV may include additional or fewer parameters than those described above.

II. Constraints on Disjoint NAV

In an exemplary embodiment, constraints can be placed on an AV NAV. In certain embodiments, such constraints can include:

T_min<Time Duration<T_max;
Iv_min<Interval Time<Iv_max;
Number of occurrences<N; and
Duty cycle=Time Duration/Interval Time<D.

In such embodiments, the Time Duration reserved for transmission is set within a range of T_min and T_max; the Interval Time is in the range of Iv_min and Iv_max; the number of occurrences is less than N; and the duty cycle, the fraction of the time duration to the interval time, is less than D.

In some embodiments, constraints can be associated with the priority of a device or its load of traffic. For example, in an exemplary embodiment, only an access point (AP) of the wireless network is allowed to set disjoint NAV and/or only AV devices are allowed to set AV NAV. In one embodiment, these constraints prevent devices from reserving the network or channel for too long and/or too frequently. Further, these constraints can be adjusted for different applications. For example, in a network with three devices, the duty cycle may be set such that D=⅓. In this example, one device cannot occupy the channel for longer than ⅓ of the total transmission time, thereby guaranteeing availability of equal amounts of transmission time for each device.

It should be noted that in some embodiments, additional or fewer constraints may be placed on the parameters of a disjoint NAV than described above.

III. Beacon Protection

In some embodiments, the disjoint NAV can be used to protect isochronous or periodic transmissions of beacons by providing the disjoint NAV in a first RTS message 511 and/or a first CTS message 512 of an exemplary embodiment of a timeline 500 as shown in FIG. 5. Devices which receive the first RTS and/or CTS 511, 512 can set NAV for transmission of a first beacon 513 and a transmission of a second beacon 523 plus a second RTS 521 and a second CTS 522 before the second beacon 523. For example, the first RTS 511 can include the following NAV parameters: NAV_RTS_D1 501, NAV_RTS_Iv 502, and NAV_RTS_D2 503. After devices receive the first RTS and the NAV parameters included therein, they can set the NAV vectors accordingly. In this exemplary embodiment, transmission of traffic 514 and 524 is deferred during NAV_RTS_D1 501 and NAV_RTS_D2 503 and accordingly, the first beacon 513 and the second beacon 523 are protected. In an exemplary embodiment, any new devices scan for RTS/CTS and beacons for a certain preset time period, T, before making any transmissions. In one embodiment, T can be set as T_max, or some other value depending on the system. In another exemplary embodiment, RTS 521 and/or CTS 522 can include additional disjoint NAV parameters to protect other beacons.

IV. Setting the AV NAV for Isochronous Traffic

As shown in an exemplary embodiment of a timeline 600 in FIG. 6, isochronous or periodic traffic 613, 623, 633 can be protected by providing an AV NAV in a first RTS message 611 and/or a first CTS message 612. Any devices that hear the first RTS/CTS message 611, 612 defer their transmissions in order not to interfere with the isochronous traffic 613, 623, 633. For example, the first RTS/CTS message 611, 612 can include AV NAV (e.g., Time duration, Interval Time, Number of occurrences as discussed above with respect to FIG. 4) and an ID for a target device. Non-target devices which receive the first RTS/CTS message set the NAV and defer transmissions during the disjoint time blocks for the number of times with the interval equal to reoccurrence time, as shown in FIG. 6. In one embodiment, the NAV remains valid when the RTS/CTS is periodically received. In one example, the NAV remains valid when the RTS/CTS 621, 622, 631, 632 are received between each transmission of isochronous traffic 613, 623, 633 as shown in the timeline 600. In this embodiment, if the RTS/CTS is not received correctly for some predefined or preset number of times, the NAV settings are cleared, thereby freeing subsequent time blocks for transmission by other devices.

In an exemplary embodiment, devices can scan traffic on the network or channel for a time T before starting a new transmission. In this embodiment, the devices can detect an RTS/CTS message indicative of existing isochronous traffic and set the NAV before transmitting so that the device does not make new transmissions that may interfere with the existing transmissions. This may guarantee QoS. In some embodiments, the time period of one transmission for a device is limited to a time period T. In this embodiment, the scanning time period and the maximum single transmission time period are the same, so if there is existing protected periodic traffic on the network or channel, at least one RTS/CTS will be transmitted during the scanning period T.

V. Combination of Disjoint NAV and AV NAV

In certain embodiments, both general (e.g., non-periodic) disjoint NAV and AV NAV can be combined into and transmitted as a single disjoint NAV vector. As shown in an exemplary embodiment of a timeline 700 in FIG. 7, for example, non-periodic traffic 713 and isochronous or periodic traffic 723, 733, . . . can be protected by providing a combined disjoint NAV in one or more of RTS/CTS messages 711, 712, 721, 722, 731, 732. For example, the first CTS message 712 can include a combination of a general disjoint NAV, e.g., (D_1 701, Iv_1 702), and an AV NAV, e.g., (D_2 703, Iv_2 704, N). Non-target devices which receive the combined disjoint NAV message can set the NAV accordingly and defer transmissions during the disjoint time blocks. While FIG. 7 illustrates embodiments in which a general disjoint NAV is followed by an AV NAV, other combinations are also possible. For example, in other embodiments, an AV NAV can be followed by a general disjoint NAV. In yet other embodiments, the combined NAV can include more than one general disjoint NAV and/or more than one AV NAV. For example, a combined NAV may include: a first general disjoint NAV, a first AV NAV, a second general disjoint NAV, and a second AV NAV.

VI. Transmitter

FIG. 8 is a flow chart illustrating an exemplary embodiment of a process 800 for reserving time blocks based on a disjoint NAV from the perspective of a transmitter (e.g., an AP device). The process 800 begins at a start state 801 and proceeds to a state 810, where the transmitter determines that it has traffic to transmit. The process 800 proceeds to a state 820, where the transmitter scans channel for a certain preset time T for any existing traffic. The process 800 proceeds to a decision state 830, where based at least in part on the channel scanning step 820, the transmitter determines whether the channel is idle or not.

If the channel is determined to be not idle (e.g. there is existing traffic and/or there is no available time slot), the process 800 loops back to the state 820, where the channel is again scanned for existing traffic. If the channel is determined to be idle, the process 800 proceeds to a state 840, where the transmitter transmits a RTS message that includes parameters for a disjoint NAV and an ID for a target device or receiver. The parameters define or specify a plurality of disjoint time blocks during which transmissions by devices other than a target device are to be deferred. For general (e.g., non-periodic) disjoint NAVs, examples of which are shown in FIG. 3 and FIG. 5, the parameters that define N (e.g., non-periodic and non-uniform length) time blocks can include a plurality of time durations (e.g., Time duration 1, Time duration 2, . . . , Time duration N) and a plurality of time intervals (e.g., Time interval 1, Time interval 2, . . . , Time interval N−1). For AV NAVs, an example of which is shown in FIG. 4, the parameters that define N (e.g., periodic and uniform length) time blocks can include: Time duration, Time interval, and N, the total number of occurrences of the time blocks. For a combined NAV, an example of which is shown in FIG. 7, the parameters includes a set of general disjoint NAV parameters (e.g., two or more time durations and one or more time intervals for non-periodic/non-uniform occurrences of time blocks) plus a set of AV NAV parameters (e.g., a time duration, time interval, and a total number for periodic occurrences of uniform periodic time blocks). It should be noted that in some embodiments, the transmitter may not transmit disjoint NAV parameters in the RTS message, and may send disjoint NAV parameters in a separate control packet. In other embodiments, the disjoint NAV parameters may be sent in a CTS message by the receiver.

The process 800 proceeds to a decision state 850, where the transmitter determines whether a CTS message is received from the target device or receiver. If the transmitter determines that it has not received the CTS message, the process 800 loops back to the state 820, where the channel is again scanned for existing traffic. If the transmitter determines that it has received the CTS message, the process 800 proceeds to a state 860, where the transmitter transmits a packet, e.g., another RTS message or other data, at a reserved time block. The process 800 then proceeds to a decision state 870, where the transmitter determines whether there is another packet to transmit. If there is no other packet to transmit, the process 800 ends at end state 890. If there is another packet to transmit, the process 800 proceeds to a decision state 880, where the transmitter determines whether there is another time block reserved for the additional packet. If the answer is no (no reserved time block), the process 800 loops back to the state 820, where the channel is again scanned for existing traffic. If the answer is yes (reserved time block), the process 800 loops back to the state 840, where the transmitter transmits another RTS, thereby alerting non-target devices. In some embodiments, the RTS includes additional NAV parameters for reserving time blocks. In one such embodiment, the RTS includes the same NAV parameters as sent previously. In another embodiment, the RTS includes no NAV parameters. The states 840, 850 and 860 for transmitting packets during reserved disjoint time blocks are repeated until it is determined that all packets have been sent during reserved time blocks at the decision states 870 and 880. When all packets have been sent, the process 800 ends at state 890.

FIG. 9 is a flow chart illustrating another exemplary embodiment of a process 900 for reserving time blocks based on a disjoint NAV from the perspective of a transmitter (e.g., an AP device). The process 900 is similar to the process 800 except that in the process 900, the transmitter does not transmit an RTS message and does not check for reception of a CTS message between time blocks that have already been reserved. Therefore, the process 900 requires less traffic to be sent over the network. Accordingly the yes path from decision state 880 of process 800 and the yes path from decision state 980 of process 900 differ. The process 800 proceeds to state 840 and transmits an RTS message and checks for reception of a CTS message, while process 900 proceeds to state 960 and immediately transmits another data packet as described below. The process 900 begins at a start state 901 and proceeds to a state 910, where the transmitter determines that it has traffic to transmit. The process 900 proceeds to a state 920, where the transmitter scans channel for a certain preset time T for any existing traffic. The process 900 proceeds to a decision state 930, where based at least in part on the channel scanning step 920, the transmitter determines whether the channel is idle or not.

If the channel is determined to be not idle (e.g. there is existing traffic and/or there is no available time slot), the process 900 loops back to the state 920, where the channel is again scanned for existing traffic. If the channel is determined to be idle, the process 900 proceeds to a state 940, where the transmitter transmits an RTS message that includes parameters for a disjoint NAV and an ID for a target device or receiver. The parameters define or specify a plurality of disjoint time blocks during which transmissions by devices other than a target device are to be deferred. For general (e.g., non-periodic) disjoint NAVs, examples of which are shown in FIG. 3 and FIG. 5, the parameters that define N (e.g., non-periodic and non-uniform length) time blocks can include a plurality of time durations (e.g., Time duration 1, Time duration 2, ..., Time duration N) and a plurality of time intervals (e.g., Time interval 1, Time interval 2, ..., Time interval N−1). For AV NAVs, an example of which is shown in FIG. 4, the parameters that define N (e.g., periodic and uniform length) time blocks can include: Time duration, Time interval, and N, the total number of occurrences of the time blocks. For a combined NAV, an example of which is shown in FIG. 7, the parameters includes a set of general disjoint NAV parameters (e.g., two or more time durations and one or more time intervals for non-periodic/non-uniform occurrences of time blocks) plus a set of AV NAV parameters (e.g., a time duration, time interval, and a total number for periodic occurrences of uniform periodic time blocks). It should be noted that in some embodiments, the transmitter may not transmit disjoint NAV parameters in the RTS message, and may send disjoint NAV parameters in a separate control packet. In other embodiments, the disjoint NAV parameters may be sent in a CTS message by the receiver.

The process 900 proceeds to a decision state 950, where the transmitter determines whether a CTS message is received from the target device or receiver. If the transmitter determines that it has not received the CTS message, the process 900 loops back to the state 920, where the channel is again scanned for existing traffic. If the transmitter determines that it has received the CTS message, the process 900 proceeds to a state 960, where the transmitter transmits a packet, e.g., another RTS message or other data, at a reserved time block. The process 900 then proceeds to a decision state 970, where the transmitter determines whether there is another packet to transmit. If there is no other packet to transmit, the process 900 ends at end state 990. If there is another packet to transmit, the process 900 proceeds to a decision state 980, where the transmitter determines whether there is another time block reserved for the additional packet. If the answer is no (no reserved time block), the process 900 loops back to the state 920, where the channel is again scanned for existing traffic. If the answer is yes (reserved time block), the process 900 loops back to the state 960 to transmit another data packet. The state 960 for transmitting packets during reserved disjoint time blocks is repeated until it is determined that all packets have been sent during reserved time blocks at the decision states 970 and 980. When all packets have been sent, the process 900 ends at state 990.

VII. Receiver

FIG. 10 is a flow chart illustrating an exemplary embodiment of process 1000 for reserving time blocks based on a disjoint NAV from the perspective of a receiver. The process as shown in FIG. 10 corresponds to an embodiment of a receiver to be used with an embodiment of a transmitter as described in FIG. 8. However, it should be noted that the process 1000 as described may be used with other embodiments of receivers as well. The process 1000 begins at a start state 1001 and proceeds to a decision state 1010, where a receiver determines whether it has received an RTS or CTS message indicative of a disjoint NAV from a transmitter. The RTS/CTS message indicative of the disjoint NAV can include parameters for the disjoint NAV and an ID for a target receiver. As indicated above, the parameters define a plurality of disjoint time blocks during which transmissions by non-target receivers are to be deferred.

If it is determined that the receiver did not receive the RTS/CTS message indicative of a disjoint NAV at the state 1010, the process 1000 proceeds to a decision state 1060, where it is queried whether one or more additional RTS/CTS messages indicative of the disjoint NAV are skipped or not received for K consecutive time periods or time intervals (e.g., superframes), for a preset time period, or before another scheduled event (e.g., a next reserved disjoint time block). If the answer is yes, the process 1000 proceeds to a state 1080, where the receiver's NAV reservations are cleared, and, the process 1000 ends at state 1090. If the answer at decision state 1060 is no, the process 1000 proceeds to a decision state 1070, where it is queried whether the NAV for the receiver is empty (e.g., not set). If yes (the NAV is empty), the process 1000 ends at the state 1090. If the answer to the query at the state 1070 is no (the NAV is not empty), the process 1000 loops back to the state 1010 where it is determined if another RTS/CTS message indicative of the disjoint NAV is received. On the other hand, if it is determined at the state 1010 that the receiver has received an RTS/CTS message indicative of a disjoint NAV, the process 1000 proceeds to a decision state 1020, where the receiver determines whether it is the target receiver, e.g., by comparing its own ID with the ID for a target included in the RTS/CTS message. It should be noted that in some embodiments, states 1060, 1070, and 1080 are omitted. For example, such embodiments may be used for a receiver corresponding to a transmitter implementing process 900 of FIG. 9. In such an embodiment, if no RTS/CTS message is received at step 1010, the process 1000 may proceed to end state 1090.

A. Non-Target Receiver

If the receiver determines that it is not the target receiver at the decision state 1020 (e.g., its ID does not match with the ID for a target), the process 1000 proceeds to a state 1030, where the receiver sets its NAV vector with the parameters received via the RTS/CTS message at the state 1010. The process 1000 then proceeds to a state 1050. In one exemplary embodiment of process 1000, such as one without states 1060, 1070, and 1080 of FIG. 10, the non-target receiver at state 1050 may defer transmission for all disjoint time blocks defined by the parameters and then proceed to an end state 1090. In the exemplary embodiment of process 1000 shown in FIG. 10, the non-target receiver (along with other non-target devices) at state 1050 defers transmissions during a next disjoint time block defined by the parameters. In the embodiment of FIG. 10, the process 1000 then proceeds to the decision state 1060, where it is queried whether one or more additional RTS/CTS messages indicative of the disjoint NAV are skipped or not received for K consecutive time periods or time intervals (e.g., superframes), for a preset time period, or before another scheduled event (e.g., a next reserved disjoint time block). If the answer is yes (skipped/not received), the process 1000 proceeds to the state 1080, where the non-target receiver's NAV reservations are cleared, and, the process 1000 ends at state 1090. For example, in some of the general (non-periodic/non uniform) disjoint NAV embodiments, the NAV can be cleared if another RTS/CTS message is not received before a next reserved disjoint time block. In some of the AV NAV embodiments, the NAV can be cleared after a predefined number of times of not receiving the RTS/CTS message. If the answer to the query at the decision state 1060 is no (not skipped/received), the process 1000 proceeds to the decision state 1070, where it is queried whether the NAV for the non-target receiver is empty (e.g., not set). If yes (the NAV is empty), the process 1000 ends at the state 1090. If the answer to the query at the state 1070 is no (the NAV is not empty), the process 1000 loops back to the state 1010, where the non-target receiver determines if another RTS/CTS message indicative of the disjoint NAV is received and the process 1000 repeats.

B. Target Receiver

If the receiver determines that it is the target receiver at the decision state 1020 (e.g., its ID matches with the ID for a target), the process 1000 proceeds to a state 1040, where the target receiver transmits a CTS message indicative of the disjoint NAV to the transmitter. In some embodiments, the CTS message indicative of the disjoint NAV includes all or part of the parameters for the disjoint NAV that the receiver receives via the RTS/CTS message at the state 1010. In other embodiment, the CTS message includes no disjoint NAV parameters. The process 1000 then proceeds to a state 1055. In one exemplary embodiment of process 1000, such as one without states 1060, 1070, and 1080 of FIG. 10, the target receiver at state 1055 may be set to receive traffic during all disjoint time blocks defined by the parameters and then proceed to an end state 1090. In the exemplary embodiment of process 1000 shown in FIG. 10, the target receiver receives traffic (e.g., AV data) from the transmitter during a next disjoint time block as defined by the parameters. As with the non-target case, the process 1000 then proceeds to the decision state 1060, where it is queried whether one or more additional RTS/CTS messages indicative of the disjoint NAV are skipped or not received for K consecutive time periods or time intervals (e.g., superframes), for a preset time period, or before another scheduled event (e.g., a next reserved disjoint time block. If the answer is yes (skipped/not received), the process 1000 proceeds to the state 1080, where the target receiver's NAV reservations (if set) are cleared, and, the process 1000 ends at state 1090. If the answer is no (not skipped/received), the process 1000 proceeds to the decision state 1070, where it is queried whether the NAV for the target receiver is empty (e.g., not set). If yes (the NAV is empty), the process 1000 ends at the state 1090. If the answer to the query at the decision state 1070 is no (the NAV is not empty), the process 1000 loops back to the state 1010, where the target receiver determines if another RTS/CTS message indicative of the disjoint NAV is received and the process 1000 repeats.

While the above processes 800, 900, and 1000 are described in the detailed description as including certain steps and states and are described in a particular order, it should be recognized that these processes may include additional steps or may omit some of the steps described. Further, each of the steps of the processes does not necessarily need to be performed in the order it is described.

Various media reservation schemes based on disjoint NAV scheme disclosed herein enables various features including, but not limited to:
- Protecting disjoint transmissions from interference;
- Protecting beacon transmissions from drifting;
- Ensuring Quality of Service of AV traffic; and
- Providing fairness constraints.

Conclusion

The aforementioned example embodiments described above can be implemented in many ways, such as program instructions for execution by a processor, as logic circuits, as an application specific integrated circuit, as firmware, etc. For example, the physical (PHY) layer 206, the media access control (MAC) layer 208, and/or the upper layer 210 can be implemented as one or more software or firmware applications, computer-implemented methods, program products stored on a computer useable medium, for execution on one or more processors (e.g., CPU, microcontroller) or other computing devices in a wireless station.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method of reserving bandwidth for disjoint time intervals in a wireless network, the method comprising:
    transmitting a first control packet comprising parameters for a disjoint network allocation vector (NAV), the parameters indicative of a plurality of disjoint time blocks during which transmissions by one or more other devices in the wireless network are to be deferred, wherein the parameters indicative of the plurality of disjoint time blocks include a plurality of time durations of the disjoint time blocks, a total number of periodic time blocks, and a plurality of time intervals between two consecutive disjoint time blocks, wherein the plurality of disjoint time blocks include: at least one beacon protection time block during which a beacon for a superframe is transmitted, and a first time duration, a time interval between two consecutive disjoint time blocks, and a second time duration, wherein the beacon is transmitted during the second time duration;
    setting the disjoint NAV;
    deferring transmissions of data packets during one or more of the plurality of disjoint time blocks; and
    clearing the disjoint NAV if a message indicative of the disjoint NAV is not received for a particular period.

2. The method of claim 1, further comprising transmitting one or more data packets to a target device during the plurality of disjoint time blocks.

3. The method of claim 1, further comprising receiving one or more data packets during the plurality of disjoint time blocks.

4. The method of claim 1, further comprising receiving a second control packet from a target device.

5. The method of claim 4, wherein the first control packet is a request-to-send (RTS) message, and the second control packet is a clear-to-send (CTS) message.

6. The method of claim 5, further comprising transmitting an RTS message and receiving a CTS message between two consecutive disjoint time blocks.

7. The method of claim 1, wherein the first control packet is a request-to-send (RTS) message or a clear-to-send (CTS) message.

8. The method of claim 7, further comprising deferring transmissions during disjoint time blocks for any devices that receive a first RTS message and a first CTS message.

9. The method of claim 8, wherein transmissions are deferred for a particular number of times with an interval equal to reoccurrence time.

10. The method of claim 7, further comprising:
    for a predefined number of times that an RTS message or a CTS message is received incorrectly, freeing time blocks for transmission by clearing NAV settings.

11. The method of claim 1, wherein the first control packet includes a target ID indicative of a target device.

12. The method of claim 1, wherein the wireless network utilizes an IEEE 802.11 standard.

13. The method of claim 1, wherein at least some of the plurality of disjoint time blocks do not occur at equal time intervals.

14. The method of claim 13, wherein the parameters indicative of the plurality of disjoint time blocks include one or more time durations of the disjoint time blocks, and one or more time intervals between two consecutive disjoint time blocks.

15. The method of claim 13, further comprising transmitting an RTS message and receiving a CTS message between two consecutive disjoint time blocks.

16. The method of claim 1, wherein at least some of the plurality of disjoint time blocks are periodic time blocks that occur at equal time intervals.

17. The method of claim 1, wherein all of the plurality of disjoint time blocks are periodic time blocks that occur at equal time intervals.

18. The method of claim 17, wherein the periodic time blocks are of a same time duration.

19. The method of claim 18, wherein at least some of the periodic time blocks include audio data, video data, or audio and video (A/V) data.

20. The method of claim 17, further comprising requiring the time duration to be: less than or equal to a preset maximum time duration; and greater than or equal to a preset minimum time duration.

21. The method of claim 17, further comprising requiring the time interval to be: less than or equal to a preset maximum time interval; and greater than or equal to a preset minimum time interval.

22. The method of claim 17, further comprising requiring a duty cycle ratio between the time duration and the time interval to be less than or equal to a preset maximum duty cycle ratio.

23. The method of claim 17, further comprising requiring the total number of the periodic time blocks to be less than or equal to a preset maximum number of time blocks.

24. The method of claim 1, wherein an RTS message is transmitted and a CTS message is received during the at least one beacon protection time block.

25. The method of claim 1, wherein the plurality of disjoint time blocks further include periodic disjoint time blocks that occur at equal time intervals.

26. A method of reserving bandwidth for disjoint time intervals in a wireless network, the method comprising:
receiving a control packet comprising parameters for a disjoint network allocation vector (NAV), the parameters indicative of a target device and a plurality of disjoint time blocks during which transmissions by one or more devices other than the target device are to be deferred, wherein the parameters indicative of the plurality of disjoint time blocks include a plurality of time durations of the disjoint time blocks, a total number of periodic time blocks, and a plurality of time intervals between two consecutive time blocks, wherein the plurality of disjoint time blocks include: at least one beacon protection time block during which a beacon for a superframe is transmitted, and a first time duration, a time interval between two consecutive disjoint time blocks, and a second time duration, wherein the beacon is transmitted during the second time duration;
determining that a receiving device is not the target device;
setting the disjoint NAV;
deferring transmissions of data packets during one or more of the plurality of disjoint time blocks; and
clearing the disjoint NAV if a message indicative of the disjoint NAV is not received for a particular period.

27. The method of claim 26, wherein the control packet includes a request-to-send (RTS) message or a clear-to-send (CTS) message.

28. The method of claim 27, further comprising periodically receiving one or more additional RTS or CTS messages, wherein the one or more additional RTS or CTS messages are indicative of the disjoint NAV.

29. The method of claim 28, wherein the message indicative of the disjoint NAV comprises an RTS or CTS message, and the particular period comprises a preset number of times.

30. The method of claim 28, wherein the message indicative of the disjoint NAV comprises an RTS or CTS message, and the particular period comprises a next scheduled disjoint time block.

31. A method of reserving bandwidth for disjoint time intervals in a wireless network, the method comprising:
receiving a first control packet comprising parameters for a disjoint network allocation vector (NAV), the parameters indicative of a target device and a plurality of disjoint time blocks during which transmissions by one or more devices other than the target device are to be deferred wherein the parameters indicative of the plurality of disjoint time blocks include a plurality of time durations of the disjoint time blocks, a total number of periodic time blocks, and a plurality of time intervals between two consecutive time blocks, wherein the plurality of disjoint time blocks include: at least one beacon protection time block during which a beacon for a superframe is transmitted, and a first time duration, a time interval between two consecutive disjoint time blocks, and a second time duration, wherein the beacon is transmitted during the second time duration;
determining that a receiving device is the target device;
receiving data packets during one or more of the plurality of the disjoint time blocks; and
clearing the disjoint NAV if an additional control packet indicative of the disjoint NAV is not received for a particular period.

32. The method of claim 31, further comprising transmitting a second control packet.

33. The method of claim 32, wherein the second control packet is indicative of the disjoint NAV.

34. The method of claim 32, wherein the first control packet includes a request-to-send (RTS) message, and the second control packet includes a clear-to-send (CTS) message.

35. The method of claim 31, further comprising periodically receiving one or more additional control packets indicative of the disjoint NAV.

36. The method of claim 35, wherein the particular period comprises a preset number of times.

37. The method of claim 35, wherein the particular period comprises a next scheduled disjoint time block.

38. A system for reserving bandwidth for disjoint time intervals in a wireless network, the system comprising:
a processor configured to:
generate a control packet comprising parameters for a disjoint network allocation vector (NAV), the parameters indicative of a plurality of disjoint time blocks during which transmissions by one or more other devices in the wireless network are to be deferred, wherein the parameters indicative of the plurality of disjoint time blocks include a plurality of time durations of the disjoint time blocks, a total number of periodic time blocks, and a plurality of time intervals between two disjoint consecutive time blocks, wherein the plurality of disjoint time blocks include: at least one beacon protection time block during which a beacon for a superframe is transmitted, and a first time duration, a time interval between two consecutive disjoint time blocks, and a second time duration, wherein the beacon is transmitted during the second time duration;
set the disjoint NAV;

defer transmissions of data packets during one or more of the plurality of disjoint time blocks; and clear the disjoint NAV if a message indicative of the disjoint NAV is not received for a preset number of times or is not received before a next scheduled disjoint time block.

39. The system of claim 38, further comprising an antenna, in data communication with the processor, configured to transmit the control packet.

40. A system for reserving bandwidth for disjoint time intervals in a wireless network, the system comprising:

a processor configured to:

receive a control packet comprising parameters for a disjoint network allocation vector (NAV), the parameters indicative of a target device and a plurality of disjoint time blocks during which transmissions by one or more devices other than the target device are to be deferred, wherein the parameters indicative of the plurality of disjoint time blocks include a plurality of time durations of the disjoint time blocks, a total number of periodic time blocks, and a plurality of time intervals between two consecutive disjoint time blocks, wherein the plurality of disjoint time blocks include: at least one beacon protection time block during which a beacon for a superframe is transmitted, and a first time duration, a time interval between two consecutive disjoint time blocks, and a second time duration, wherein the beacon is transmitted during the second time duration;

determine if a receiving device is the target device;

set the disjoint NAV if the receiving device is not the target device;

defer transmissions of data packets during one or more of the plurality of disjoint time blocks if the disjoint NAV is set; and receive data packets during one or more of the plurality of the disjoint time blocks if the receiving device is the target device.

41. The system of claim 40, further comprising an antenna, in data communication with the processor, configured to receive the control packet.

42. The system of claim 40, wherein the wireless network operates at a frequency from about 2.4 GHz to about 60 GHz.

43. A system for reserving bandwidth for disjoint time intervals in a wireless network, the system comprising:

a processor configured to:

generate a control packet comprising parameters for a disjoint network allocation vector (NAV), the parameters indicative of a plurality of disjoint time blocks during which transmissions by one or more other devices in the wireless network are to be deferred, wherein the parameters indicative of the plurality of disjoint time blocks include a plurality of time intervals between two consecutive disjoint time blocks, a total number of periodic time blocks, and a plurality of time intervals between two consecutive time blocks, wherein the plurality of disjoint time blocks include: at least one beacon protection time block during which a beacon for a superframe is transmitted, and a first time duration, a time interval between two consecutive disjoint time blocks, and a second time duration, wherein the beacon is transmitted during the second time duration;

determine that a receiving device is not a target device;

set the disjoint NAV;

defer transmissions of data packets during one or more of the plurality of disjoint time blocks; and for a predefined number of times that a message indicative of a disjoint NAV is received incorrectly, free time blocks for transmission by clearing NAV settings.

* * * * *